(12) United States Patent
Griffo et al.

(10) Patent No.: US 8,470,060 B2
(45) Date of Patent: *Jun. 25, 2013

(54) MANUFACTURE OF THERMALLY STABLE CUTTING ELEMENTS

(75) Inventors: Anthony Griffo, The Woodlands, TX (US); Madapusi K. Keshavan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/155,043

(22) Filed: Jun. 7, 2011

(65) Prior Publication Data

US 2011/0232200 A1 Sep. 29, 2011

Related U.S. Application Data

(63) Continuation of application No. 12/026,525, filed on Feb. 5, 2008, now Pat. No. 8,002,859.

(60) Provisional application No. 60/888,449, filed on Feb. 6, 2007.

(51) Int. Cl.
*B24D 3/00* (2006.01)
*B24D 3/02* (2006.01)
*E21B 10/36* (2006.01)

(52) U.S. Cl.
USPC ............... 51/293; 51/309; 175/433; 175/434

(58) Field of Classification Search
USPC ............................. 51/309, 293; 175/433, 434
See application file for complete search history.

(56) References Cited

U.S. PATENT DOCUMENTS

| 4,224,380 | A | * | 9/1980 | Bovenkerk et al. ........... 428/545 |
|---|---|---|---|---|
| 4,534,773 | A | * | 8/1985 | Phaal et al. ..................... 51/293 |
| 4,664,705 | A | | 5/1987 | Horton et al. |
| 4,871,377 | A | | 10/1989 | Frushour |
| 8,002,859 | B2 | * | 8/2011 | Griffo et al. ..................... 51/307 |
| 8,172,916 | B2 | * | 5/2012 | Fujimura et al. ................ 51/307 |
| 8,236,074 | B1 | | 8/2012 | Bertagnolli et al. |
| 2007/0169419 | A1 | * | 7/2007 | Davis et al. ..................... 51/293 |
| 2008/0250723 | A1 | * | 10/2008 | Fragiacomo .................... 51/298 |
| 2010/0294571 | A1 | * | 11/2010 | Belnap et al. ................. 175/434 |

FOREIGN PATENT DOCUMENTS

| EP | 1958688 A1 | 8/2008 |
|---|---|---|
| WO | 2008/063568 A1 | 5/2008 |

OTHER PUBLICATIONS

British Search and Examination Report issued in related British Application No. GB1206076.0; Dated May 4, 2012 (4 pages).
British Examination Report issued in related British Application No. GB0805168.2; Dated May 4, 2012 (3 pages).
Great Britain Examination Report issued in related Great Britain Application No. GB1206076.0; Dated Jun. 26, 2012 (1 page).
U.S Office Action issued for U.S. Appl. No. 12/399,369, mailed on Apr. 25, 2012 (11 pages).
British Examination Report issued in related British Application No. GB0805168.2; Dated Aug. 9, 2011 (2 pages).
US Office Action issued for U.S. Appl. No. 12/399,369 mailed Oct. 19, 2012 (36 pages).

* cited by examiner

*Primary Examiner* — Shuangyi Abu Ali
(74) *Attorney, Agent, or Firm* — Osha Liang LLP (57) ABSTRACT

A method of forming a thermally stable cutting element that includes disposing at least a portion of a polycrystalline abrasive body containing a catalyzing material to be leached into a leaching agent; and subjecting the polycrystalline abrasive object to an elevated temperature and pressure is disclosed. Thermally stable cutting elements and systems and other methods for forming thermally stable cutting elements are also disclosed.

6 Claims, 4 Drawing Sheets

MANUFACTURE OF THERMALLY STABLE CUTTING ELEMENTS

CROSS-REFERENCE TO RELATED APPLICATIONS

This patent application is a continuation patent application of U.S. patent application Ser. No. 12/026,525, filed on Feb. 5, 2008.

This application, pursuant to 35 U.S.C. §119(e), claims priority to U.S. Patent Application Ser. No. 60/888,449, filed on Feb. 6, 2007, and U.S. Patent Application No. 60/941,616, filed on Jun. 1, 2007, which are herein incorporated by reference in their entirety.

BACKGROUND OF INVENTION

1. Field of the Invention

The invention relates generally to polycrystalline diamond composites and cutting structures. More particularly, this invention relates to polycrystalline diamond cutting structures that have a high thermal stability.

2. Background Art

Polycrystalline diamond compact ("PDC") cutters have been used in industrial applications including rock drilling and metal machining for many years. In a typical application, a compact of polycrystalline diamond (PCD) (or other superhard material) is bonded to a substrate material, which is typically a sintered metal-carbide to form a cutting structure. PCD comprises a polycrystalline mass of diamonds (typically synthetic) that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

A PDC cutter may be formed by placing a cemented carbide substrate into the container of a press. A mixture of diamond grains or diamond grains and catalyst binder is placed atop the substrate and treated under high pressure, high temperature conditions. In doing so, metal binder (often cobalt) migrates from the substrate and passes through the diamond grains to promote intergrowth between the diamond grains. As a result, the diamond grains become bonded to each other to form the diamond layer, and the diamond layer is in turn bonded to the substrate. The substrate often comprises a metal-carbide composite material, such as tungsten carbide. The deposited diamond layer is often referred to as the "diamond table" or "abrasive layer."

Conventional PCD includes 85-95% by volume diamond and a balance of the binder material, which is present in PCD within the interstices existing between the bonded diamond grains. Binder materials that are typically used in forming PCD include Group VIII elements, with cobalt (Co) being the most common binder material used.

Figure 1:
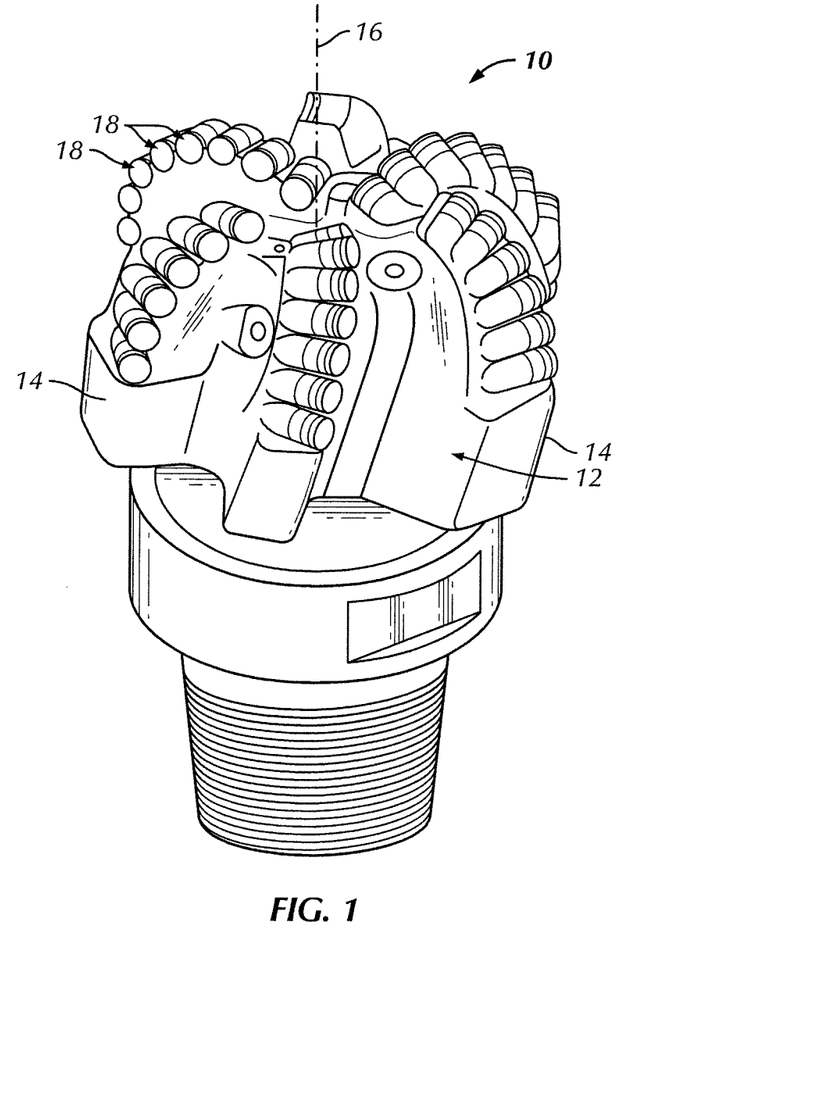
FIG. 1 is an illustration of a PDC drill bit.

An example of a rock bit for earth formation drilling using PDC cutters is shown in FIG. 1. FIG. 1 shows a rotary drill bit 10 having a bit body 12. The lower face of the bit body 12 is formed with a plurality of blades 14, which extend generally outwardly away from a central longitudinal axis of rotation 16 of the drill bit. A plurality of PDC cutters 18 are disposed side by side along the length of each blade. The number of PDC cutters 18 carried by each blade may vary. The PDC cutters 18 are individually brazed to a stud-like carrier (or substrate), which may be formed from tungsten carbide, and are received and secured within sockets in the respective blade.

A significant factor in determining the longevity of PDC cutters is the generation of heat at the cutter contact point, specifically at the exposed part of the PDC layer caused by friction between the PCD and the work material. This heat causes thermal damage to the PCD in the form of cracks (due to differences in thermal expansion coefficients) which lead to spalling of the polycrystalline diamond layer, delamination between the polycrystalline diamond and substrate, and back conversion of the diamond to graphite causing rapid abrasive wear. The thermal operating range of conventional PDC cutters is typically 750° C. or less.

As mentioned, conventional polycrystalline diamond is stable at temperatures of up to 700-750° C., after which observed increases in temperature may result in permanent damage to and structural failure of polycrystalline diamond. This deterioration in polycrystalline diamond is due to the significant difference in the coefficient of thermal expansion of the binder material, cobalt, as compared to diamond. Upon heating of polycrystalline diamond, the cobalt and the diamond lattice will expand at different rates, which may cause cracks to form in the diamond lattice structure and result in deterioration of the polycrystalline diamond. Damage is also due to graphite formation at diamond-diamond necks leading to loss of microstructural integrity and strength loss.

In order to overcome this problem, strong acids may be used to "leach" the cobalt from the diamond lattice structure (either a thin volume or entire tablet) to at least reduce the damage experienced from heating diamond-cobalt composite at different rates upon heating. Examples of "leaching" processes can be found, for example, in U.S. Pat. Nos. 4,288,248 and 4,104,344. Briefly, a strong acid, typically nitric acid or combinations of several strong acids (such as nitric and hydrofluoric acid) may be used to treat the diamond table, removing at least a portion of the co-catalyst from the PDC composite. By leaching out the cobalt, thermally stable polycrystalline (TSP) diamond may be formed. In certain embodiments, only a select portion of a diamond composite is leached, in order to gain thermal stability without losing impact resistance. As used herein, the term TSP includes both of the above (i.e., partially and completely leached) compounds. Interstitial volumes remaining after leaching may be reduced by either furthering consolidation or by filling the volume with a secondary material, such by processes known in the art and described in U.S. Pat. No. 5,127,923, which is herein incorporated by reference in its entirety.

While leaching processes with nitric/hydrofluoric acid are successful, they tend to be lengthy and dangerous. Further, leaching with stronger concentrations of acid would create an extremely hazardous working environment. Using mixtures of acids can easily take many weeks in order to leach out the cobalt.

Accordingly, there exists a need for methods and apparatuses that accelerate the leaching process, and/or reduce the hazards inherent in the leaching process.

SUMMARY OF INVENTION

In one aspect, embodiments of the present disclosure relate to a method of forming a thermally stable cutting element that includes disposing at least a portion of a polycrystalline abrasive body containing a catalyzing material to be leached into a leaching agent; and subjecting the polycrystalline abrasive object to an elevated temperature and pressure.

In another aspect, embodiments disclosed herein relate to a method of forming a thermally stable cutting element that includes forming a polycrystalline diamond body of interconnected diamond particles with a catalyzing material disposed in the interstitial spaces interposed between the diamond particles; placing the polycrystalline diamond body and a leaching agent in a pressure vessel; subjecting the pressure vessel and its content to an elevated temperature and pressure thereby causing the catalyzing material to be substantially removed from the polycrystalline diamond body; and attaching the polycrystalline diamond body having substantially all catalyzing material removed therefrom to a carbide substrate.

In another aspect, embodiments disclosed herein relate to a system for producing thermally stable cutting elements that includes a heat source; a pressure vessel, comprising: a container for holding a polycrystalline diamond body to be heated, the container comprising a base, a chemically resistant liner, and a removable lid; and a sealing means for sealing said container opening; and a leaching agent disposed in the pressure vessel; and a polycrystalline diamond body of interconnected diamond particles with a catalyzing material to be removed from the interstitial spaces interposed between the diamond particles.

In another aspect, embodiments disclosed herein relate to a thermally stable cutting element formed from a plurality of diamond particles and a catalyzing material, wherein the cutting element includes a body of interconnected diamond particles with a catalyzing material substantially removed from the interstitial spaces interposed between the diamond particles by pressure-assisted leaching, the diamond particles comprising at least about 85 percent by volume of the body.

In yet another aspect, embodiments disclosed herein relate to a method of forming a thermally stable cutting element that includes forming a polycrystalline diamond body of interconnected diamond particles with a catalyzing material disposed in the interstitial spaces interposed between the diamond particles, the diamond particles comprising at least about 85 percent by volume of the body; removing substantially all the catalyzing material from the polycrystalline diamond body; and attaching the polycrystalline diamond body having substantially all catalyzing material removed therefrom to a carbide substrate by sintering.

Other aspects and advantages of the invention will be apparent from the following description and the appended claims.

DETAILED DESCRIPTION

In one aspect, embodiments disclosed herein relate to thermally stable cutting elements and methods for decreasing the amount of time required to leach a polycrystalline diamond body or cutter to a desired depth. More specifically, embodiments disclosed herein involve accelerating techniques used in conjunction with treatments of a leaching agent to remove undesired material (such as a catalyst) used in the manufacture of a diamond table. The accelerating techniques that may be used in conjunction with conventional leaching processing in various embodiments of the present disclosure include elevated pressures, elevated temperatures, and/or ultrasonic energy.

Forming Polycrystalline Diamond

A polycrystalline diamond body may be formed in a conventional manner, such as by a high pressure, high temperature sintering of "green" particles to create intercrystalline bonding between the particles. "Sintering" may involve a high pressure, high temperature (HPHT) process. Examples of high pressure, high temperature (HPHT) process can be found, for example, in U.S. Pat. Nos. 4,694,918; 5,370,195; and 4,525,178. Briefly, to form the polycrystalline diamond object, an unsintered mass of diamond crystalline particles is placed within a metal enclosure of the reaction cell of a HPHT apparatus. A suitable HPHT apparatus for this process is described in U.S. Pat. Nos. 2,947,611; 2,941,241; 2,941,248; 3,609,818; 3,767,371; 4,289,503; 4,673,414; and 4,954,139. A metal catalyst, such as cobalt or other Group VIII metals, may be included with the unsintered mass of crystalline particles to promote intercrystalline diamond-to-diamond bonding. The catalyst material may be provided in the form of powder and mixed with the diamond grains, or may be infiltrated into the diamond grains during HPHT sintering An exemplary minimum temperature is about 1200° C. and an exemplary minimum pressure is about 35 kilobars. Typical processing is at a pressure of about 45 kbar and 1300° C. Those of ordinary skill will appreciate that a variety of temperatures and pressures may be used, and the scope of the present invention is not limited to specifically referenced temperatures and pressures.

Diamond grains useful for forming a polycrystalline diamond body may include any type of diamond particle, including natural or synthetic diamond powders having a wide range of grain sizes. For example, such diamond powders may have an average grain size in the range from submicrometer in size to 100 micrometers, and from 1 to 80 micrometers in other embodiments. Further, one skilled in the art would appreciate that the diamond powder may include grains having a mono- or multi-modal distribution.

The diamond powder may be combined with the desired catalyst material, and the reaction cell is then placed under processing conditions sufficient to cause the intercrystalline bonding between the diamond particles. It should be noted that if too much additional non-diamond material is present in the powdered mass of crystalline particles, appreciable intercrystalline bonding is prevented during the sintering process. Such a sintered material where appreciable intercrystalline bonding has not occurred is not within the definition of PCD. Following such formation of intercrystalline bonding, a polycrystalline diamond body may be formed that has, in one embodiment, at least about 80 percent by volume diamond, with the remaining balance of the interstitial regions between the diamond grains occupied by the catalyst material. In other embodiments, such diamond content may comprise at least 85 percent by volume of the formed diamond body, and at least 90 percent by volume in yet another embodiment. However, one skilled in the art would appreciate that other diamond densities may be used in alternative embodiments. Thus, the polycrystalline diamond bodies being leached in accordance with the present disclosure include what is frequently referred to in the art as "high density" polycrystalline diamond. One skilled in the art would appreciate that conventionally, as diamond density increases, the leaching time (and potential inability to effectively leach) similarly increases.

Further, one skilled in the art would appreciate that, frequently, a diamond layer is sintered to a carbide substrate by placing the diamond particles on a preformed substrate in the reaction cell and sintering. However the present disclosure is not so limited. Rather, the polycrystalline diamond bodies treated in accordance with the present disclosure may or may not be attached to a substrate.

In a particular embodiment, the polycrystalline diamond body is formed using solvent catalyst material provided as an infiltrant from a substrate, for example, a WC—Co substrate, during the HPHT process. In such embodiments where the polycrystalline diamond body is formed with a substrate, it may be desirable to remove the polycrystalline diamond portion from the substrate prior to leaching so that leaching agents may attack the diamond body in an unshielded manner, i.e, from all sides of the diamond body without substantial restriction.

Further, one skilled in the art would appreciate that the same techniques used with polycrystalline diamond may be applied to polycrystalline cubic boron nitride (PCBN). Similar to polycrystalline diamond, PCBN may be formed by sintering boron nitride particles (typically CBN) via a HPHT process, similar to those for PCD, to sinter "green" particles to create intercrystalline bonding between the particles. CBN refers to an internal crystal structure of boron atoms and nitrogen atoms in which the equivalent lattice points are at the corner of each cell. Boron nitride particles typically have a diameter of approximately one micron and appear as a white powder. Boron nitride, when initially formed, has a generally graphite-like, hexagonal plate structure. When compressed at high pressures (such as 106 psi), CBN particles will be formed with a hardness very similar to diamond, and a stability in air at temperatures of up to 1400° C.

According to one embodiment of the invention, PCBN may include a content of boron nitride of at least 50% by volume; at least 70% by volume in another embodiment; at least 85% by volume in yet another embodiment. In another embodiment, the cubic boron nitride content may range from 50 to 80 percent by volume, and from 80 to 99.9 percent by volume in yet another embodiment. The residual content of the polycrystalline cubic boron nitride composite may include at least one of Al, Si, and mixtures thereof, carbides, nitrides, carbonitrides and borides of Group IVa, Va, and VIa transition metals of the periodic table. Mixtures and solid solutions of Al, Si, carbides, nitrides, carbonitrides and borides of Group IVa, Va, and VIa transition metals of the periodic table may also be included.

Accelerated Leaching

In various embodiments, a formed PCD body having a catalyst material in the interstitial spaces between bonded diamond grains is subjected to a leaching process in conjunction with at least one accelerating technique, whereby the catalyst material is removed from the PCD body. As used herein, the term "removed" refers to the reduced presence of catalyst material in the PCD body, and is understood to mean that a substantial portion of the catalyst material no longer resides in the PCD body. However, one skilled in the art would appreciate that trace amounts of catalyst material may still remain in the microstructure of the PCD body within the interstitial regions and/or adhered to the surface of the diamond grains.

The quantity of the catalyst material remaining in the material PCD microstructure after the PCD body has been subjected to a leaching treatment may vary, for example, on factors such as the treatment conditions, including treatment time. Further, one skilled in the art would appreciate that it may be desired in certain applications to allow a small amount of catalyst material to stay in the PCD body. In a particular embodiment, the PCD body may include up to 1-2 percent by weight of the catalyst material. However, one skilled in the art would appreciate that the amount of residual catalyst present in a leached PCD body may depend on the diamond density of the material, and body thickness.

As described above, a conventional leaching process involves the exposure of an object to be leached with a leaching agent, such as described in U.S. Pat. No. 4,224,380, which is herein incorporated by reference in its entirety. In select embodiments, the leaching agent may be a weak, strong, or mixtures of acids. In other embodiments, the leaching agent may be a caustic material such as NaOH or KOH. Suitable acids may include, for example, nitric acid, hydrofluoric acid, hydrochloric acid, sulfuric acid, phosphoric acid, or perchloric acid, or combinations of these acids. In addition, caustics, such as sodium hydroxide and potassium hydroxide, have been used to the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, etc.

While conventional leaching techniques may require many weeks for sufficient removal of catalyst material from a PCD body to occur, in accordance with the present disclosure, accelerating techniques may be applied to the leaching process to decrease the amount of treatment time required to reach the same level of catalyst removal. In a particular embodiment, the leaching of a PCD body may be accelerated by subjecting the leaching environment and thus the PCD body to an elevated pressure. As used herein, the term "elevated pressure" refers to pressures greater than atmospheric pressure. Suitable pressure levels may include elevated pressure levels ranging from about 5 to 345 bar, and ranging from about 5 to 100 bar in another embodiment. However, one skilled in the art would appreciate that the particular pressure may be dependent, for example, on the particular equipment used, the temperature selected, amount (and type) of leaching agent present, and total system volume.

Elevated pressure conditions may be obtained, for example, by conducting a leaching process in a pressure vessel. Suitable pressure vessels include any type of closed environment or container in which a leaching process may be performed with application of elevated pressure levels. One of ordinary skill in the art would appreciate that depending on the various combinations of accelerating techniques, the leaching may be performed for example, in an open container placed within a closed container, where the closed container is pressurized, or in a closed pressurized container (optionally within a second closed container). For example, one skilled in the art would appreciate that when using a closed container, the elevated pressures may be derived from (and thus dependent on) vapor pressures contained within the container at elevated temperatures. Thus, the extent of the pressure elevation may be a function of the temperature, amount of leaching agent present, and total system volume.

Further, in addition to elevated pressures, elevated temperatures may also be a technique by which the leaching of a PCD body may be accelerated. As used herein, the term "elevated temperature" refers to a temperature that is close to or above the boiling point of the liquid in which the PCD body to be leached is submersed. Suitable temperature levels may range from the boiling point to three times the boiling point of the leaching agent solution, for example, from about 90 to 350° C. in one embodiment and from about 175 to 225° C. in another embodiment. Further, one skilled in the art would appreciate that the selection of an elevated temperature may be dependent, for example, on the type of leaching agent selected, so that, for example, the boiling point may be reached while still avoiding flash boiling of the leaching agent. Further, the source of the elevated temperatures is not a limitation of the scope of the present disclosure. Thus, one skilled in the art would appreciate that such heating may be provided, for example, conventional resistance-based heating such as conventional oven or furnace heating or a volumetric-based heating such as microwave heating.

In various embodiments, a PCD object to be leached may be disposed in a pressure vessel with leaching agent(s), and the pressure vessel and its contents be exposed to elevated temperatures. Such vessels may include those known in the art as acid digestion bombs. Vessels suitable for use in embodiments of the present disclosure include those described, for example, in U.S. Pat. Nos. 5,369,034, 4,933,529, 4,882,128, and 6,744,024, which are herein incorporated by reference in their entirety. Alternative types of vessels may include autoclaves. Various vessels are commercially available, for example, from Parr Instrument Company (Moline, Ill.) and Berghof/America (Coral Springs, Fla.).

Figure 2:
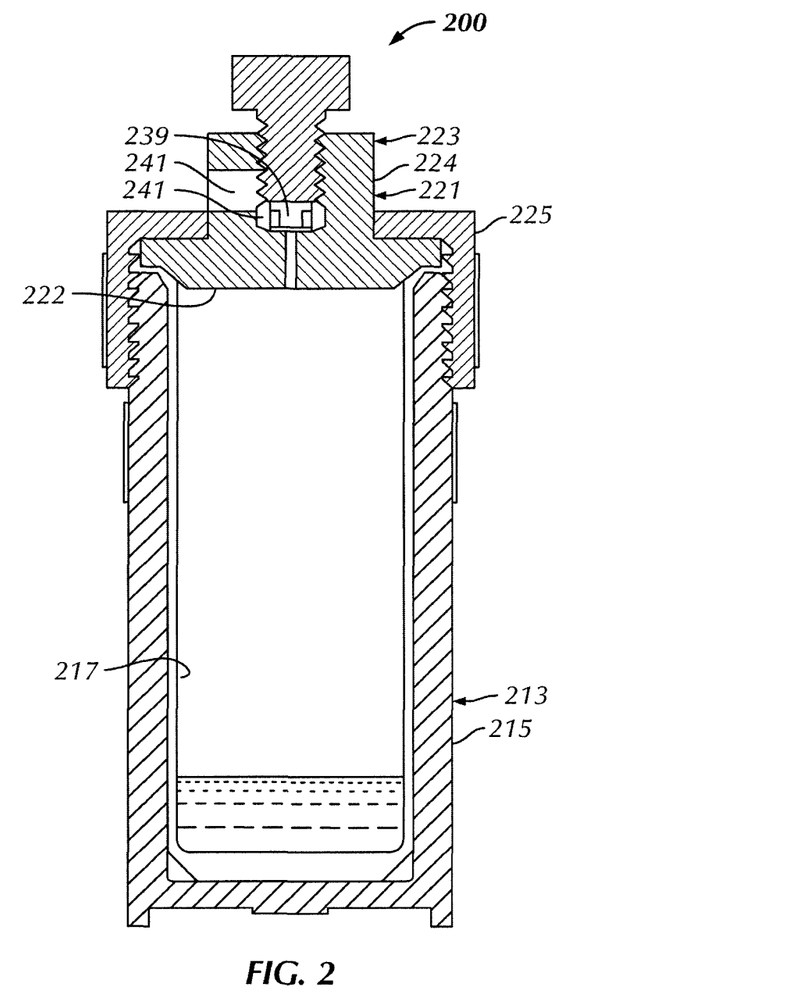
FIG. 2 is an illustration of a PDC cutter.

Referring to FIG. 2, a pressure vessel according to one embodiment of the present disclosure is shown. Pressure vessel 200 includes a container body 213 (which may be comprised of two parts, body 215 and liner 217) having an opening 219 at the top end thereof. Container body 213 is closed by closure 221, which includes closure portion 223 and holding collar 225 which threadably engages with body 215. Closure portion 223 includes sealing section 222 and boss 224. Body 215 is of a material of construction which of sufficient strength (tensile strength) and other physical characteristics, including dimensions, so that it can withstand internal pressures in ranges likely to be encountered in various heating and digestion operations in which the container may be employed. Such pressure ranges may range, for example, up to 5000 psi. However, a venting means 239 is provided for the container 200 so that if pressures generated within the container 200 exceed the limits for which the container is designed, the generated pressures will vent from the container to the external environment. Such venting means 239 may include a rupturable diaphragm (not shown separately), which under normal pressures seals the interior of the container 200 from the passageways 241 leading to the exterior environment Most suitable synthetic organic polymeric plastic materials for such body 213 are any of the polyether imides, such as those sold under the ULTEM® trademark by General Electric Corporation, but others of the "engineering plastics," fiber reinforced plastics, such as glass fiber reinforced polyesters or polyethers, or other polymers known to be of good strengths and/or transmissive of microwaves (when microwave heating is used) may also be used. Further, one skilled in the art would appreciate that any configuration of a sealed, but ventable container may be used for forming a pressure vessel such as the one shown in FIG. 2 may be used to leach polycrystalline diamond bodies in accordance with the present disclosure.

Inside body 215, as a part of the container body means 213, is liner 217, which is essentially or completely transparent to microwave radiation and is also resistant to damage from chemical attack by strong chemicals, such as strong acids, often employed as leaching agents. Materials of construction suitable for manufacture of such liners, such as fluorinated alkylenes or perfluorocarbons, e.g., polytetrafluoroethylene and other polymers of this type sold under the tradename TEFLON® or other tradenames may be employed, with the preferred materials being TEFLON PFA and TEFLON FEP, but other chemically resistant plastics, such as chloroprene, silicone, ethylene, propylene and other suitable polymers, under the proper circumstances, may also be used. However, at elevated temperature, such polymers and others which are satisfactorily resistant to chemical reactions with the materials being heated or by the digestion mixes are not usually sufficiently strong to resist pressures that may be developed in the container and therefore such are normally employed only as liners within strengthening body members which are made of other, stronger materials. Further, one skilled in the art would appreciate that, in alternative embodiments, the liner and body of the vessel may be made of a single material, without the need for a separate liner. For example, when using microwave heating, if microwave- and other radiant energy-transmissive materials that are available or may become available are satisfactorily resistant to chemical damage from the contained materials and are strong enough to resist pressures developed during the heatings of such materials in the closed container the container body means may be made of one piece of one material, without the need for a separate liner.

While the above description references microwave transparent materials for use in the pressure vessel, one of ordinary skill in the art would appreciate that should a pressure vessel be used without application microwave energy, the material requirements for liner and/or body container may vary accordingly. Further, while the above description has described one particular type of pressure vessel in obtaining elevated pressures, no limitation is intended on the scope of the present invention. One of ordinary skill in the art would recognize that the elevated pressure may be achieved directly or indirectly. That is, it specifically within the scope of the present invention that the elevated pressure may result as a by-product of one or more other applied conditions.

Further, it is also envisioned that the application of pressure may be coupled with the application of ultrasonic energy to accelerate the leaching process. Ultrasonic energy is mechanical, vibratory energy in the form of sound that operates at frequencies beyond audible sound (18,000 cycles per second and greater). An ultrasonic stack is generally formed of a converter or piezoelectric transducer, an optional booster and a sonotrode (also called a horn).

In a typical arrangement, the piezoelectric transducer is formed of a piezoelectric crystal connected to an electrical energy source, such as a battery, through a wire. Piezoelectric crystals may be used to convert electrical energy into mechanical energy or be used to convert mechanical energy into electrical energy. For example, in one embodiment, electrical charges may be sent from the electrical energy source through the wire to the piezoelectric crystal.

The electrical charges may then be converted by the piezoelectric crystal into acoustic energy (e.g. mechanical energy) such that an acoustic signal may be produced. The piezoelectric crystal may be comprised of many materials, ceramics and quartz crystals being most common. Specifically, in one embodiment, the piezoelectric crystal may be comprised of Kézite K600, available from Keramos of Piezo Technologies, which is a modified lead zirconate titanate piezoelectric ceramic.

The material of the piezoelectric crystal may then be modified in various ways to produce different wave modes of the acoustic signal. For example, the overall shape of the piezoelectric crystal determines a sound field of the acoustic signal produced from the piezoelectric crystal.

Further, the thickness of the piezoelectric crystal may determine the frequency of the acoustic energy produced by the piezoelectric crystal. Specifically, the piezoelectric crystal produces a wavelength about twice its thickness.

Boosters are used to modify the amplitude of the mechanical vibration A sontotrode, or horn, is used to apply the vibration. All three elements of the stack are specifically tuned to resonate at the same exact ultrasonic frequency (typically 20, 30, 35 or 40 kHz)

As noted above, a power supply (also known as an electronic ultrasonic generator) delivers a high power AC signal with frequency matching the resonance frequency of the piezoelectric crystal.

Figure 3:
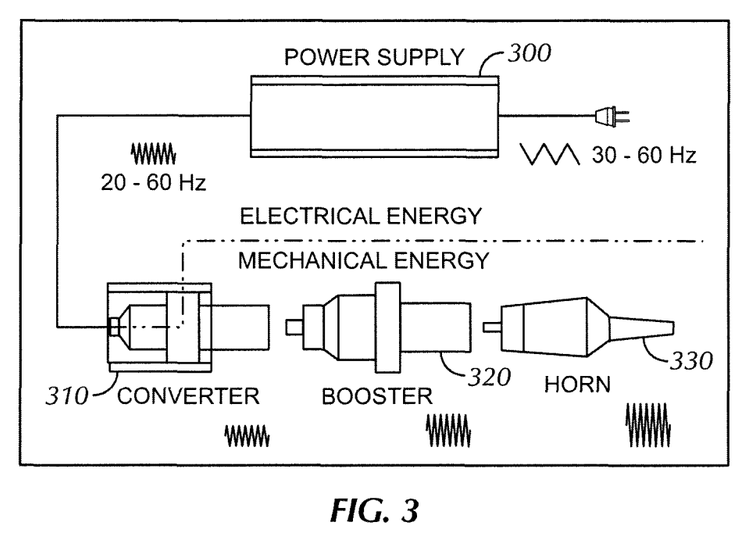
FIG. 3 is a pressure vessel in accordance with a disclosed embodiment.

FIG. 3 provides a schematic example of an ultrasonic apparatus for use in disclosed embodiments. In FIG. 3, high frequency electrical energy is delivered, via a power supply 300, to a piezoelectric crystal (shown as converter 310) where the high frequency electrical energy is converted to high frequency ultrasonic mechanical energy. That energy is then sent to booster 320, and finally is transferred to a horn 330.

Figure 4:
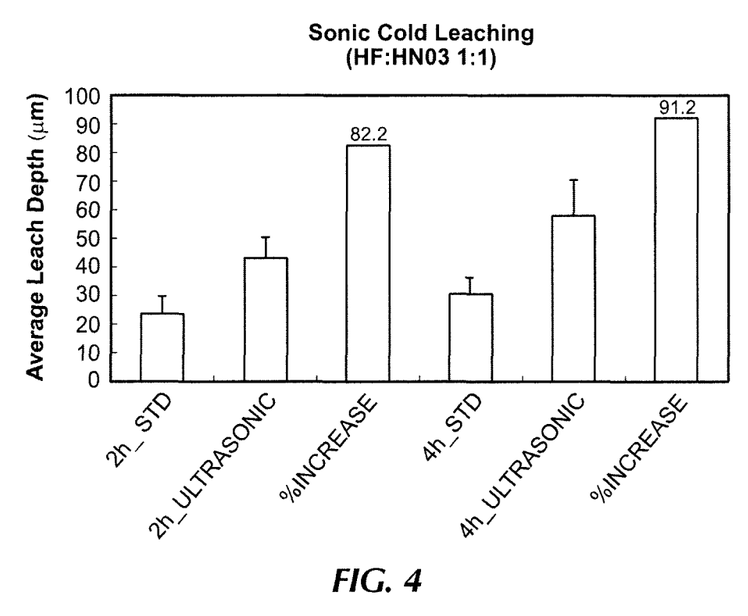
FIG. 4 is a schematic of an ultrasonic emitter in accordance with a disclosed embodiment.

Turning to FIG. 4, the effect of applying ultrasound to a leaching process may be seen. In particular, in FIG. 4, the average leach depth is graphed (in microns) versus the leaching conditions at 2 and 4 hours for a leaching process that includes 1:1 $HF:HNO_3$, with and without the application of ultrasonic energy. The leaching was performed under ambient temperatures and pressures. As can be seen from the graph, simply by applying ultrasound to the leaching process, an 80% increase in leaching depth is seen after two hours, and a 90% increase in leaching depth is seen after 4 hours. Advantageously, therefore, the overall time to reach a leach depth may be reduced simply by applying ultrasound.

Further, as mentioned above, while the above discussion has applied to PCD cutting elements, those having ordinary skill in the art will appreciate that these techniques may be more generally applied to any material that requires the leaching of a material (such as a catalyst) from its surrounding matrix. In particular, embodiments disclosed herein apply to "free-standing" PCD bodies, such as, PCD wafers having no carbide substrate. Such PCD bodies may have been formed "free-standing" or may have been detached from a carbide substrate prior to leaching. In a particular embodiment, the PCD bodies may be at least 1 mm thick, and at least 1.5 or 2 mm thick in alternate embodiments Further when such "free-standing" PCD bodies are leached, in particular embodiments, the leached PCD bodies may be attached (or reattached) to a substrate, to facilitate attached to a bit, cutting tool, or other end use, for example. Such methods of reattachment may include sintering a leached PCD body with a substrate in a second HPHT sintering step, such as discussed in U.S. Patent Applications No. 60/941,616, filed on Jun. 1, 2007, which is assigned to the present assignee and herein incorporated by reference in its entirety. Further, as discussed in U.S. Patent Applications No. 60/941,616, the interstitial regions (or at least a portion thereof) previously occupied by the catalyzing material that has been removed by the leaching process may optionally be filled with a variety of infiltrants or replacement materials using any number of techniques, including liquid-phase sintering under HPHT conditions, pressure techniques. The type of infiltrant or replacement material is not a limitation on the scope of the present disclosure. Rather any type of infiltrant or replacement materials may be used, including, for example, non-refractory metals such as copper or other Group IB metals or alloys thereof, Group VIII metals such as cobalt, nickel, and iron, ceramics, silicon, and silicon-containing compounds, ultra-hard materials such as diamond and cBN. In a particular embodiment, the source of infiltrant or replacement material may be a substrate that is attached to the leached PCD body during an HPHT process. Substrates useful in this regard may include those substrates that are used to form conventional PCD, including those formed from metals, ceramics, and/or cermet materials that contain a desired infiltrant, such as a substrate formed from WC—Co. Further, in specific embodiments, the substrate may be formed of a cermet such as WC and a binder material including Group IB metals or alloys thereof such as Cu, Ag, Au, Cu—W, Cu—Ti, Cu—Nb, or the like. In such an embodiment where it is preferred that a catalyst material such as cobalt does not infiltrate into the leached PCD, it may be desirable to use a substrate having at least one infiltrant material with a melting temperature below 1200° C., and limiting the HPHT sintering temperatures accordingly so that such the replacement material infiltrates into the PCD body without causing any catalyst material present in the substrate to melt and enter the PCD body.

Additionally, although a substrate may be attached to the leached PCD body during the introduction of the replacement infiltrant material, it is also understood that the substrate may alternatively be attached to the PCD body after the desired infiltrant has been introduced. In such an embodiment, the infiltrant material may be introduced, for example, by an HPHT process that does not use the substrate material as an infiltrant source, and the desired substrate may be attached to the diamond body by a separate HPHT process or other method, such as by brazing, welding, or the like.

Further, one skilled in the art would also appreciate that, as described in U.S. Patent Applications No. 60/941,616, an intermediate material may be attached between the PCD body and a substrate to facilitate attachment and acting as a barrier to prevent or minimize the migration of catalyst material within the substrate into the PCD body. Alternatively, if such catalyst material does migrate or infiltrate into the PCD body during reattachment, it is within the scope of the present disclosure the PCD body filled with the infiltrant material may be treated to remove a portion of the infiltrant material therefrom. Techniques useful for removing the infiltrant material include chemical treatment such as acid leaching or aqua regia bath, electrochemical treatment, such an electrolytic process, liquid metal solubility techniques, liquid metal infiltration techniques, or combinations thereof.

Figure 5A:
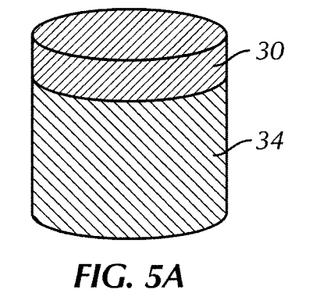
FIG. 5 is a chart illustrating the decrease in leaching time when using ultrasound in contrast to prior art leaching techniques.
Figure 5B:
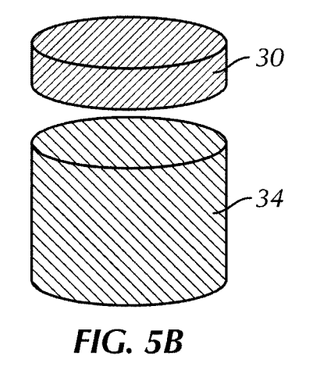
Figure 5C:
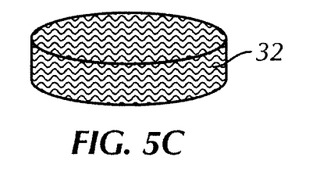
Figure 5D:
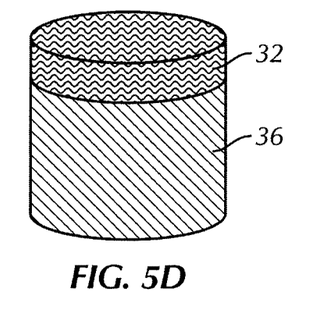

Referring to FIGS. 5A-D, collectively, an embodiment of the process steps of the present disclosure is shown. As shown in FIG. 5A, a polycrystalline diamond body 30 having a catalyzing material found in the interstitial regions between the diamond grains (as described above) may be formed attached to a carbide substrate 34. The polycrystalline diamond body 30 may be detached (shown in FIG. 5B) from the substrate 34 prior to treatment of the polycrystalline diamond body 30 by accelerated leaching techniques disclosed herein. Alternatively, a polycrystalline diamond body 30 may be formed without a substrate. Leaching of polycrystalline diamond body 30 removes at least a substantial portion of the catalyzing material from the interstitial regions, leaving a polycrystalline diamond body 32 (shown in FIG. 5C) having voids therein (which may optionally be filled with an infiltrant subsequent to the leaching). Further, as shown in FIG. 5D, the polycrystalline diamond body 32 may then be attached (or reattached) to a substrate 36 through HPHT sintering.

Following all processing and treatment steps, the cutting elements of the present disclosure may have a polycrystalline diamond body having diamond grains with an average grain size of less than 20 microns, and ranging from about 9 to 15 microns in a particular embodiment. Such average grain sizes after treatment may be estimated by using electron backscatter diffraction of cross-sections of multiple PCD bodies with a scanning electron microscope, and using a mean linear intercept method.

EXAMPLE

In an exemplary method, a PCD body, including cobalt as a binder catalyst material in the interstitial spaces of the microstructure is disposed in pressure vessel (125 mL capacity pressure bomb from Parr Instruments) containing a $HNO_3/HF/H_2O$ mixture (1:1:1 ratio) in an amount of 10 mL per PCD body (16 mm, 2 mm thick). The pressure vessel is placed in an oven and heated to 180-200° C., such that the increasing temperature causes the generation of pressures within the vessel (for example, ranging from 5-50 bar). After 4 days of sitting in pressure vessel at the increased temperature, the leaching agent may be replenished, with a cool down prior to removing the vessel from the oven. Conventional leaching techniques, such baths may take as much as twelve weeks (for low density diamond) or more (greater diamond density and/or thickness) to achieve the desired removal. However, use of the pressure vessel may reduce the leach time to less than 2 weeks to achieve the same desired amount of removal.

Advantageously, embodiments disclosed herein may provide a reduced leaching time as compared to prior art techniques. In addition, embodiments may allow the use of weaker acids, which may reduce the likelihood of injury during the manufacturing process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of forming a thermally stable cutting element, comprising:

forming a polycrystalline diamond body of interconnected diamond particles with a catalyzing material disposed in the interstitial spaces interposed between the diamond particles;

placing the polycrystalline diamond body and a leaching agent in a pressure vessel;

subjecting the pressure vessel and its content to an elevated temperature and pressure thereby causing the catalyzing material to be substantially removed from the polycrystalline diamond body; and attaching the polycrystalline diamond body having substantially all catalyzing material removed therefrom to a carbide substrate.

2. The method of claim 1, wherein the leaching agent comprises at least one of nitric acid, hydrofluoric acid, and mixtures thereof.

3. The method of claim 1, wherein the elevated temperature is up to 350° C. and the elevated pressure is greater than 5 bar.

4. The method of claim 3, wherein the elevated temperature ranges from 175° C. to 225° C. and the elevated pressure ranges from 10 to 50 bar.

5. The method of claim 1, wherein during the step of forming, the polycrystalline diamond body is formed on a carbide substrate, and further comprising:

detaching the polycrystalline diamond body from the carbide substrate prior to the placement of the polycrystalline diamond body in the pressure vessel.

6. The method of claim 1, wherein after attaching the polycrystalline diamond body to the carbide substrate, the diamond particles have an average grain size of less than 20 microns.

* * * * *